Figure 1:
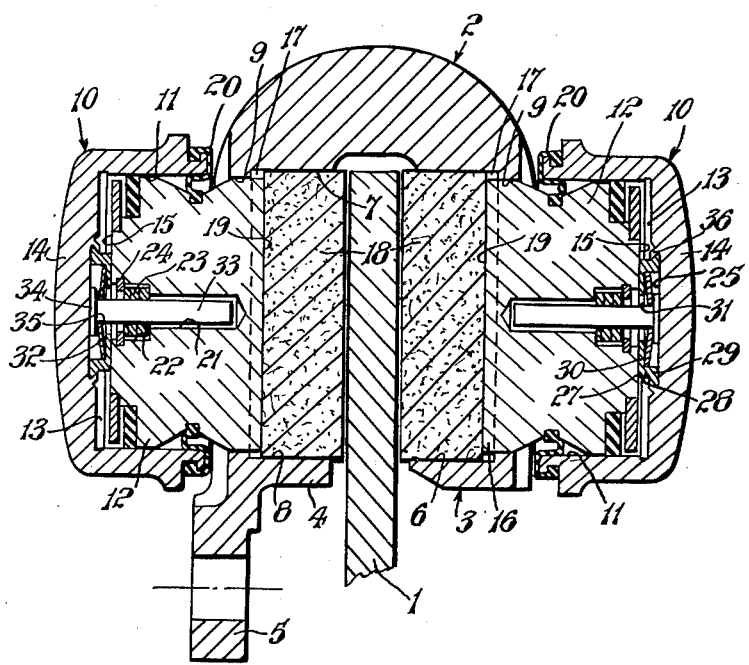

May 16, 1961   H. J. BUTLER   2,984,319
AUTOMATIC ADJUSTING DEVICES
Filed March 5, 1957

INVENTOR
Henry James Butler
by Benj. T. Rauber
Attorney

United States Patent Office 2,984,319
Patented May 16, 1961

2,984,319
AUTOMATIC ADJUSTING DEVICES

Henry James Butler, Sutton Coldfield, England, assignor to Dunlop Rubber Company Limited, London, England, a British company Filed Mar. 5, 1957, Ser. No. 644,023
Claims priority, application Great Britain Mar. 9, 1956
7 Claims. (Cl. 188—73)

This invention relates to automatic adjusting devices and more particularly relates to automatic adjusting devices for brakes, clutches or the like.

As is well known in the art, the continued operation of brakes or clutches over a period of time causes the friction material gradually to wear away until, eventually, it requires to be renewed. Means to permit the renewal of the friction pads without extensive dismantling of the braking system or interference with the hydraulic lines leading from the brake to the master cylinder form the subject-matter of co-pending Hopkinson patent application Ser. No. 666,413, filed June 18, 1957, now Patent No. 2,937,723, granted May 24, 1960.

Wear of the friction pads requires to be compensated if undue movement of the brake-actuating mechanism is to be avoided as the wear increases, and my invention provides automatic adjusting means which are particularly adapted for this purpose, but which are also equally adapted for similar applications where automatic adjustment of the axial separation of two relatively-movable members is required.

The invention further provides a disc brake or clutch in which such automatic adjusting means are incorporated.

According to my present invention, therefore, an automatic adjusting device comprises a close-coiled spring wire helix and a pin held in frictional engagement therein, said helix and said pin being secured each to one of a pair of relatively-movable members and said pin having a limited axial movement relative to the member to which it is secured, whereby upon relative movement between said members said device is adapted to move in unison therewith through said limited axial movement and upon further relative movement between said members relative movement also takes place between said helix and said pin.

Also, according to my invention, a disc brake comprises a rotatable disc, a non-rotatable supporting member, a pad of friction material axially slidable in said member frictionally to engage a radially-extending side of said disc, a cylinder associated with said member in axial alignment with said friction pad and having a connection to a source of fluid-pressure, a piston fluid-tightly slidable in said cylinder to force said friction pad into frictional engagement with said disc, and an automatic adjusting device of the type herein described associated with said piston and said cylinder.

The closely-wound helix of spring wire or rod is preferably located in a blind hole formed centrally in the base of the piston of a fluid operated piston and cylinder brake-actuating mechanism, and the head of said pin is held in the base of the cylinder co-axially of said blind hole.

In order to maintain the normal running clearance between the disc and the friction pad when the brake is disengaged and to provide a limited axial movement of the pin and the piston in unison, a Belleville washer is placed over the stem of the pin and is located between the head of the pin and the abutment on the base of the cylinder.

Figure 2:
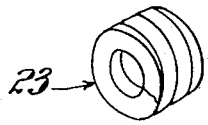

The invention is illustrated by way of example in the accompanying drawings, in which:

Figure 1 is a sectional view of a portion of a disc brake showing a preferred embodiment of the automatic adjusting device, and Figure 2 is a perspective view of the helical member of Figure 1.

As illustrated in the drawings, a disc brake comprises a rotatable disc 1 which is secured at its inner periphery to a wheel, shaft or other rotatable member in the known manner and is rotatable therewith. A non-rotatable caliper-type housing 2, which straddles a portion of the periphery of the disc 1 in the known manner, has axially-opposed limbs 3, 4 which extend radially inwardly adjacent the opposed radial faces of the disc 1. The limb 4 is provided with an extension 5 whereby it is secured to a non-rotatable portion of the vehicle or the like to which the brake is to be applied. The housing 2 when secured to the non-rotatable portion of the vehicle or the like constitutes a non-rotatable torque-absorbing member. The two limbs 3, 4 of the housing 2 are each provided with a cylindrical aperture 6, 7, each said aperture comprising a large diameter portion 8 adjacent the disc 1, and a smaller diameter portion 9 on the axially-outer end of the portion 8. The apertures 6 and 7 are coaxially aligned on opposite sides of the disc 1 and are also aligned with the respective braking surfaces of the disc 1.

A cylinder 10 is suitably secured, as by bolting, to each limb 3, 4 of the housing 2, the bore 11 of each cylinder 10 being co-axial with its respective aperture 6, 7. The open end of each cylinder 10 is presented towards the associated limb 3, 4 of the housing 2 and is spaced a short distance axially therefrom. A piston 12 is fluid-tightly slidable in the bore 11 of each cylinder 10 and in the fully-retracted position of the piston, a space 13 exists between the base 14 of the cylinder and the adjacent face 15 of the piston 12 and is adapted to be connected in the known manner to a source of pressure-fluid which may be a master-cylinder of any known type.

Each piston 12 is provided, on the side remote from the base 14 of the cylinder 10, with a diametrical projection 16 which is adapted to be received in a cooperating recess 17 in the adjacent surface of a pad 18 of friction material, and said pad may be further secured to the piston, as by dovetailing of the respective formations 16, 17 or by adhesion. Each piston is provided with a conventional sealing ring.

The friction pads 18 are received in, and are slidable within, the larger diameter portions 8 of the apertures 6, 7 in the housing limbs 3, 4 and the pistons 12 are freely slidable in the smaller diameter portions 9 of said apertures, the heads 19 of said pistons 12 being normally entered for a short distance into said portions 9.

Each piston is resiliently connected to the open end of its associated cylinder by a folded annular rubber or rubber-like resilient sealing member 20, the peripheries of which are received, respectively, in annular grooves formed in the periphery of the piston 12 and the external wall of the cylinder 10. These sealing members 20, besides acting as dust and dirt seals for the open end of the cylinder, possess sufficient resilience to tend to force the piston against the hydraulic head of liquid in the system when the brake is inoperative.

Each piston 12 is provided with a blind hole 21 extending axially and concentrically into the piston from the base 15 thereof to a position adjacent, but clear of, the base of the projection 16. From the base 15 of the piston 12 and extending thereinto for a distance of the order of one-third of the axial depth of the piston, the hole 21 is increased to a larger diameter, and into this larger diameter portion 22 is inserted a close-wound helix 23 (Figure 2) formed by winding a plurality of abutting coils of substantially square-sectioned spring wire. The helix is secured in said hole 21 against axial movement by a circular spring clip 24 which is received in an appropriate annular groove in the wall of the bore portion 22.

Formed in the inner surface of the base 14 of each cylinder 10, concentrically of the bore 11 thereof and of the hole 21 in the piston 12, is a circular recess 25, and into this is inserted a cup-like member 27 which comprises a cylindrical wall 28 having a radially-outwardly-extending flange 29 at one end thereof and a radially-inwardly extending annular flange 30 at the other end thereof, the inner periphery of the flange 30 defining an aperture 31 lying concentric with the blind hole 21.

Prior to insertion of the member 27 in the recess 25 a Belleville washer 32 is placed in the recess in the member 27 defined by the cylindrical portion 28 and the flange 30 and a pin 33 having a flat disc-like head 34 is passed through the Belleville washer 32 and the aperture 31 so that the head 34 lies adjacent said washer 32 inside the recess in the member 27. The member 27 is then placed in the recess 25, so that the pin 33 extends co-axially and concentrically of the bore 11 of the cylinder 10, and is secured in the recess as by peening or upsetting the metal of the base 14 of the cylinder over the flange 29 as at 36.

With the pin 33 and member 27 assembled in the cylinder 10, the piston 12 is then pressed into the bore 11 so that the pin 33 enters the cylindrical interior of the helix 23. The pin 33 is an interference fit in this helix, and as it is pressed into the interior thereof the coils tend to unwind very slightly and the pin 33 is accordingly gripped by these turns throughout 360° of its circumference and for a portion of its length.

In the normal inoperative position of the brake parts, the friction pads 18 are held just clear of the rotating disc 1 by a distance equivalent to the axial depth of the spaces 35 defined by the amount of "dish" or curvature in the Belleville washers 32, the washers 32 co-operating with the resilient annuli 20 to return the pistons 12 and friction pads 18 steadily in this retracted position.

Upon the admission of pressure-fluid into the spaces 13, as by operation of a master-cylinder by the known type of brake pedal or like means, the pistons 12 and friction pads 18 are forced towards the adjacent friction surfaces of the disc 1 to apply the brakes.

If the clearance between the friction pads 18 and the disc 1 is equal to, or less than, the axial depth of the spaces 35, movement of the pistons 12 and their associated friction pads 18 towards the disc 1 will cause the pads frictionally to engage the disc before, or at the same time as, the spaces 35 are eliminated by axial movement of the pins 33 in unison with the pistons 12 and the consequent flattening of the Belleville washers 32 against the flanges 30 by the heads 34 of the pins 33. In such a condition the pins 33 and pistons 12 move in unison in both directions, i.e. in the application and the release of the brakes.

When, after repeated applications of the brake, the friction pads 18 become worn and the space between the friction pads 18 and the adjacent surfaces of the disc 1 exceeds the axial depth of the spaces 35 the admission of pressure-fluid to the spaces 13 and unified movement of the pistons 12 and pins 33 until the spaces 35 are eliminated is insufficient to cause the friction pads 18 to be sufficiently pressed against the adjacent surfaces of the disc 1. Pressure fluid continues to be fed to the spaces 13 and the fluid-pressure in these spaces continues to force the pistons outwardly of the cylinders 10 until the friction pads 18 are fully engaged with the disc. At this stage, further axial movement of the pins 33 is prevented by the flattening of the Belleville washers 32 and the abutment of the heads 34 and washers 32 against the flanges 30, and the frictional engagement between the pins 33 and the friction members 23 is accordingly overcome, and relative movement occurs between the pins 33 and the members 23 to take up the movement in excess of the axial depth of the spaces 35. Upon release of the fluid pressure in the spaces 13 the Belleville washers 32 and resilient members 20 combine to retract the pistons and friction pads from the disc through a distance equal to the curvature in the washers 32, i.e., the axial depth of the spaces 35. Thus, the spaces between the friction pads 18 and the adjacent surfaces of the disc 1 have automatically been returned to the normal clearance equivalent to the axial depth of the spaces 35, and wear of the friction pads 18 has been compensated, so that progressive wear of the pads does not require a greater movement of the brake-applying means.

Although the above description is given as though the automatic adjustment is a substantial periodic adjustment, in practice it occurs whenever any effective wear on the friction pads has taken place and may amount to an infinitesimal adjustment on each application of the brake. In periods of prolonged or heavy braking this adjustment may take place as a running compensation while the brake is actually in operation.

Location of the pins 33 co-axially of the pistons 12 ensures that the minor resistance to movement of the pistons and friction pads towards the disc imposed by the Belleville washers 32, and the action of the friction members 23 on the pins 33, are all applied coaxially of the pistons and friction pads, thus eliminating any tendency of the pistons and friction pads to tilt or bind in the respective passages through, or in, which they slide. This prevents uneven application of the friction pads and resultant uneven wear thereof.

The use of the present invention is not confined to disc brakes, as it may be readily adapted for use in clutches of similar construction. The use is also not confined to vehicle brakes, as it may equally readily be adapted to brakes for aircraft or for industrial machinery.

Furthermore, while the location of the automatic adjusting device coaxially of the piston and cylinder is to be preferred, this is by no means essential and the automatic adjusting device may be disposed in any other convenient relationship thereto. One or a plurality of such devices may be arranged in suitable positions outside the cylinder if so desired.

Having now described my invention, what I claim is:

1. An automatic adjusting device comprising a close-coiled spring wire helix and a pin held in frictional engagement therein, a pair of members movable relatively to each other in a direction axially of said pin, means securing said helix to one of said members and means carried by the other of said members and securing said pin for limited axial movement relative thereto whereby upon relative movement between said members said helix and pin move as a unit with the member to which said helix is secured through said limited axial movement and upon further relative movement between said members, relative movement also takes place between said helix and said pin.

2. An adjusting device according to claim 1 wherein said relatively-movable members comprise a piston and cylinder mechanism and wherein the helix is secured within a recess in the piston and the pin is secured with limited axial movement to the base of the cylinder.

3. An adjusting device according to claim 2 wherein the base of the cylinder has a retaining member secured thereto and the end of the pin remote from the piston is provided with a head located for limited axial movement between the base of the cylinder and said retaining member.

4. An adjusting device according to claim 3 wherein spring means are provided between the head of the pin and the retaining member to normally force said head against the base of the cylinder.

5. A disc brake comprising a rotatable disc, a non-rotatable supporting member, a pad of friction material axially slidable in said member frictionally to engage a radially extending side of said disc, said member comprising a cylinder axially aligned with said friction pad, said friction pad being between said cylinder and said disc, a piston slidable fluid-tightly in said cylinder to force said friction pad into frictional engagement with said disc and having a recess extending axially from the face of said piston adjacent the base of said cylinder and an automatic adjusting device comprising a pin extending axially from the base of said cylinder into said piston and having a connection with said cylinder to permit limited axial movement relative thereto and a close-coiled spring wire helix secured in said recess in said piston and encircling said pin in frictional engagement therewith to permit relative axial movement of said spring wire helix and pin when said pin is at the limit of its axial movement relative to said cylinder.

6. A disc brake according to claim 5 wherein said limited axial movement between the head of the pin and the base of the cylinder equals the normal running clearance between the disc and the friction pad when the brake is idle.

7. An automatic adjusting device to permit one of two objects to move forwardly relative to the other without restriction and to limit rearward movement of said object relative to the other, which comprises two members one of said members being a pin and the other being a spring wire helix encircling said pin and in frictional engagement therewith to permit relative forward movement axially of one of said members relative to the other only upon application of force sufficient to overcome said frictional engagement, and means for engaging one of said members with one of said objects and the other member with the other of said objects, at least one of said means engaging one of said members with one of said objects to permit limited relative movement therebetween, said means including resilient means to return one of said objects through said limit of movement.

References Cited in the file of this patent

UNITED STATES PATENTS

| | | |
|---|---|---|
| 636,330 | Glover | Nov. 7, 1899 |
| 2,531,341 | Meador | Nov. 21, 1950 |
| 2,570,570 | Lee | Oct. 9, 1951 |
| 2,669,327 | Chamberlain et al. | Feb. 16, 1954 |
| 2,733,781 | Brisson | Feb. 7, 1956 |
| 2,808,903 | Kovac | Oct. 8, 1957 |
| 2,866,526 | Wiseman | Dec. 30, 1958 |

FOREIGN PATENTS

| | | |
|---|---|---|
| 217,350 | Great Britain | Oct. 27, 1954 |
| 728,251 | Great Britain | Apr. 13, 1955 |